United States Patent
Ueda et al.

(10) Patent No.: US 11,217,439 B2
(45) Date of Patent: Jan. 4, 2022

(54) MASS SPECTROMETER

(71) Applicant: SHIMADZU CORPORATION, Kyoto (JP)

(72) Inventors: Manabu Ueda, Kyoto (JP); Takashi Umemoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/022,899

(22) Filed: Sep. 16, 2020

(65) Prior Publication Data

US 2021/0151313 A1    May 20, 2021

(30) Foreign Application Priority Data

Nov. 20, 2019   (JP) ............................. JP2019-209483

(51) Int. Cl.
*H01J 49/42*   (2006.01)
*G01N 30/72*   (2006.01)
(Continued)

(52) U.S. Cl.
CPC .......... *H01J 49/4215* (2013.01); *G01N 30/72* (2013.01); *H01J 49/062* (2013.01);
(Continued)

(58) Field of Classification Search
CPC .... H01J 49/4215; H01J 49/24; H01J 49/0013; H01J 49/062; H01J 49/068; H01J 49/4225; G01N 30/72; G01N 2030/027
(Continued)

(56) References Cited

U.S. PATENT DOCUMENTS 11,043,371 B2 *   6/2021   Ueda ................... H01J 49/4225
2013/0015341 A1 *  1/2013   Steiner ................ H01J 49/4255
                                                      250/281
(Continued)

FOREIGN PATENT DOCUMENTS

WO   2019/155543 A1   8/2019

OTHER PUBLICATIONS

"ACQUITY QDa Kenshutsuki—Shituryou Bunseki (MS) Kenshutuki (ACQUITY QDa Detector—Mass Spectrometric (MS) Detector)", Nihon Waters K.K., [accessed on Oct. 29, 2019], the Internet <URL: http://www.waters.com/waters/ja_JP/ACQUITY-QDa-Mass-Detector-for-Chromatographic-Analysis/nav.htm?local=ja_JP&cid=134761404>, pp. 1-6.

*Primary Examiner* — Kiet T Nguyen
(74) *Attorney, Agent, or Firm* — Sughrue Mion, PLLC (57) ABSTRACT

A vacuum chamber 11 for forming a vacuum space has two side walls opposite to each other across an ion beam axis extending within the vacuum space. One of those side walls is openable and closeable. An ion optical element 21 is placed on a base 33, which is located on the bottom surface of the vacuum chamber. A fixation band 213 fixes the ion optical element on the base by holding the element between the base and the fixation band so as to press the element onto the base. A band-catching portion 10d, located on an inside face of a side wall of the vacuum chamber on the opposite side from the openable-and-closeable side wall, catches one end of the fixation band. A band-fixing portion 214, located on the base on the side where the openable-and-closeable side wall is present, fixes the other end of the fixation band to the base.

9 Claims, 9 Drawing Sheets

(51) Int. Cl.
*H01J 49/24* (2006.01)
*H01J 49/06* (2006.01)
*G01N 30/02* (2006.01)

(52) U.S. Cl.
CPC ............ *H01J 49/068* (2013.01); *H01J 49/24* (2013.01); *H01J 49/4225* (2013.01); *G01N 2030/027* (2013.01)

(58) Field of Classification Search
USPC .................................................. 250/290, 289
See application file for complete search history.

(56) References Cited

U.S. PATENT DOCUMENTS

2020/0381236 A1* 12/2020 Ueda ........................ H01J 29/82
2020/0395207 A1* 12/2020 Ueda ........................ H01J 49/24
2021/0175066 A1* 6/2021 Ueda ........................ H01J 49/06

* cited by examiner

MASS SPECTROMETER

TECHNICAL FIELD

The present invention relates to a mass spectrometer. The present invention is suitable for a mass spectrometer in which a quadrupole mass filter and/or collision cell is contained in an analysis chamber having a high degree of vacuum.

BACKGROUND ART

In a common type of quadrupole mass spectrometer, ions are generated from compounds in a sample within an ion source. The various generated ions are separated from each other according to their mass-to-charge ratios m/z by a quadrupole mass filter. The separated ions are detected with an ion detector. In the case of a triple quadrupole mass spectrometer including two quadrupole mass filters respectively located on the front and rear sides of a collision cell, the various ions generated in the ion source are separated from each other according to their mass-to-charge ratios by the front quadrupole mass filter so that an ion having a specific mass-to-charge ratio (precursor ion) is selectively introduced into the collision cell. In the collision cell, the precursor ion is dissociated into various product ions by collision induced dissociation (CID) or a similar technique. The thereby generated product ions are separated from each other according to their mass-to-charge ratios by the rear quadrupole mass filter, and the separated product ions are detected with the ion detector.

In those types of mass spectrometers, neutral particles and ions originating from the sample adhere to ion optical elements during an analysis, such as the rod electrodes forming a quadrupole mass filter or rod electrodes arranged within the collision cell. Therefore, if the device is used for a long period of time, those ion optical elements gradually undergo contamination, and a disturbance occurs in the electric fields created by those elements. Consequently, deterioration occurs in some performances of the device, such as the detection sensitivity or mass accuracy. Accordingly, if the device performance has become unstable due to the contamination of an ion optical element (or the like), it is necessary to perform maintenance work which includes removing a quadrupole mass filter unit or collision cell from the device, cleaning the element(s) and other related tasks. In conventional and common types of mass spectrometers, a cover that can be opened as needed is provided in the upper portion of the vacuum chamber so as to facilitate such maintenance work. When the cover is opened, the quadrupole mass filter or collision cell can be removed upward from the vacuum chamber or set into the chamber from above (see Patent Literature 1).

A liquid chromatograph mass spectrometer (LC-MS) system employing the previously described type of mass spectrometer as a detector unit typically consists of a plurality of units including, in addition to the detector unit, a liquid supply unit which includes a pump for supplying a mobile phase, an injection unit which injects a sample into the supplied mobile phase, and a column oven unit which contains a column. Conventional and common types of mass spectrometers are considerably larger in size than those units except for the detector unit, and therefore, are placed apart from those units. Therefore, LC-MS systems require comparatively large spaces for installation.

However, with the expanding application areas of the LC-MS system, there has been a strong demand for a reduction of the installation space for the system. Some of the systems developed in recent years have been considerably downsized as compared to conventionally and commonly known quadrupole mass spectrometers. For example, an LC-MS system disclosed in Non Patent Literature 1 has a detector unit which is a mass spectrometer and yet is roughly as small in size as other units, thereby allowing for a system configuration in which some of those units, including the detector unit, are vertically stacked.

CITATION LIST

Patent Literature

Patent Literature 1: WO 2019/155543 A

Non Patent Literature

Non Patent Literature 1: "ACQUITY QDa Kenshutsuki—Shituryou Bunseki (MS) Kenshutuki (ACQUITY QDa Detector—Mass Spectrometric (MS) Detector)", Nihon Waters K. K., [accessed on Oct. 29, 2019], the Internet

SUMMARY OF INVENTION

Technical Problem

Mass spectrometers having such a special design for downsizing have the following problem:

A detector unit consisting of a mass spectrometer includes a vacuum chamber, vacuum pump and other components made of stainless steel (or the like). Therefore, this unit is heavier than the other units forming the LC-MS system. Accordingly, it is common practice to set the detector unit at the lowermost level when vertically stacking a plurality of units. An LC-MS system configured in this manner requires the units stacked on top of the detector unit to be removed when it is necessary to maintain a quadrupole mass filter or other components of the detector unit. This makes the maintenance work extremely complex and time-consuming.

The present invention has been developed to solve the previously described problem. Its objective is to provide a mass spectrometer which allows the maintenance work for ion optical elements (including quadrupole mass filters) and other related components to be easily performed while maintaining a high level of attachment accuracy and other qualities even in the case where there are other devices, such as the component units of an LC-MS system, stacked on top of the mass spectrometer.

Solution to Problem

One mode of the mass spectrometer according to the present invention developed for solving the previously described problem includes:

a vacuum chamber configured to form a vacuum space inside, the vacuum chamber having two side walls opposite to each other across an ion beam axis extending within the vacuum space, with one of the side walls being openable and closeable;

an ion optical element configured to perform a predetermined operation on an ion originating from a sample;

a base located on the bottom surface of the vacuum chamber, with the ion optical element placed on the base;

a fixation band in the form of a thin plate for fixing the ion optical element on the base by holding at least a portion of the ion optical element between the base and the fixation band so as to press the ion optical element onto the base;

a band-catching portion configured to catch one end of the fixation band, the band-catching portion located on an inside face of a side wall of the vacuum chamber on the opposite side from the openable-and-closeable side wall of the vacuum chamber; and a band-fixing portion configured to fix the other end of the fixation band to the base, the band-fixing portion located on an area of the base on the side where the openable-and-closeable side wall of the vacuum chamber is present.

In the previously described mode of the mass spectrometer according to the present invention, examples of the ion optical element include any type of element configured to control the behavior of ions by an effect of an electric field, such as a quadrupole mass filter, ion guide, ion lens, ion trap, deflector and reflector. A collision cell (or the like) which provides a space for dissociating ions should also be included in the category of ion optical element.

Advantageous Effects of Invention

In the previously described mode of the mass spectrometer according to the present invention, for example, an elongated vacuum chamber is arranged so that it extends in the front-to-rear direction. In this case, the ion beam axis within the vacuum space inside the vacuum chamber also extends in the front-to-rear direction. One of the two side walls s facing each other across the ion beam axis is configured to be openable and closeable. When an ion optical element needs to be removed from the device to the outside, an operator opens the aforementioned side wall of the vacuum chamber. Then, the band-fixing portion can be seen in front of the ion optical element as viewed from the opening of the vacuum chamber. The operator releases the band-fixing portion from the fixing position. For the fixation of the band-fixing portion, a separate member may be used, such as a screw.

On the back side of the ion optical element as viewed from the opening of the vacuum chamber, the fixation band is simply caught by the band-catching portion. Unlike the band-fixing portion, the operator can easily remove the fixation band from the band-catching portion without having to remove a screw or perform a similar task. After the fixation band has been removed, the operator can separate the ion optical element from the base and remove it through the opening to the outside of the device. When attaching the ion optical element to the inside of the device, the operator only needs to follow the previously described removal steps in the reverse order.

The previously described mode of the mass spectrometer according to the present invention allows the removal and attachment of an ion optical element to be performed from one side of the device. Therefore, the maintenance work for an ion optical element can be performed even with another device still placed on top of the mass spectrometer, i.e. without removing that device. Thus, a high level of working efficiency can be achieved. The removal and attachment of an ion optical element can be achieved through simple tasks, such as the removal or tightening of a screw in front of the ion optical element. This does not only allow the removal and attachment of the ion optical element to be efficiently performed, but also prevents some accidents, such as a tool or similar object coming in contact with the ion optical element and damaging it. Despite the simplicity of the task, the ion optical element can be accurately attached to a correct position.

DESCRIPTION OF EMBODIMENTS

First Embodiment

A mass spectrometer as the first embodiment of the present invention is hereinafter described with reference to the attached drawings.

The present mass spectrometer is a single type of quadrupole mass spectrometer including an atmospheric pressure ion source employing an electrospray ionization (ESI) or similar method.

Figure 1:
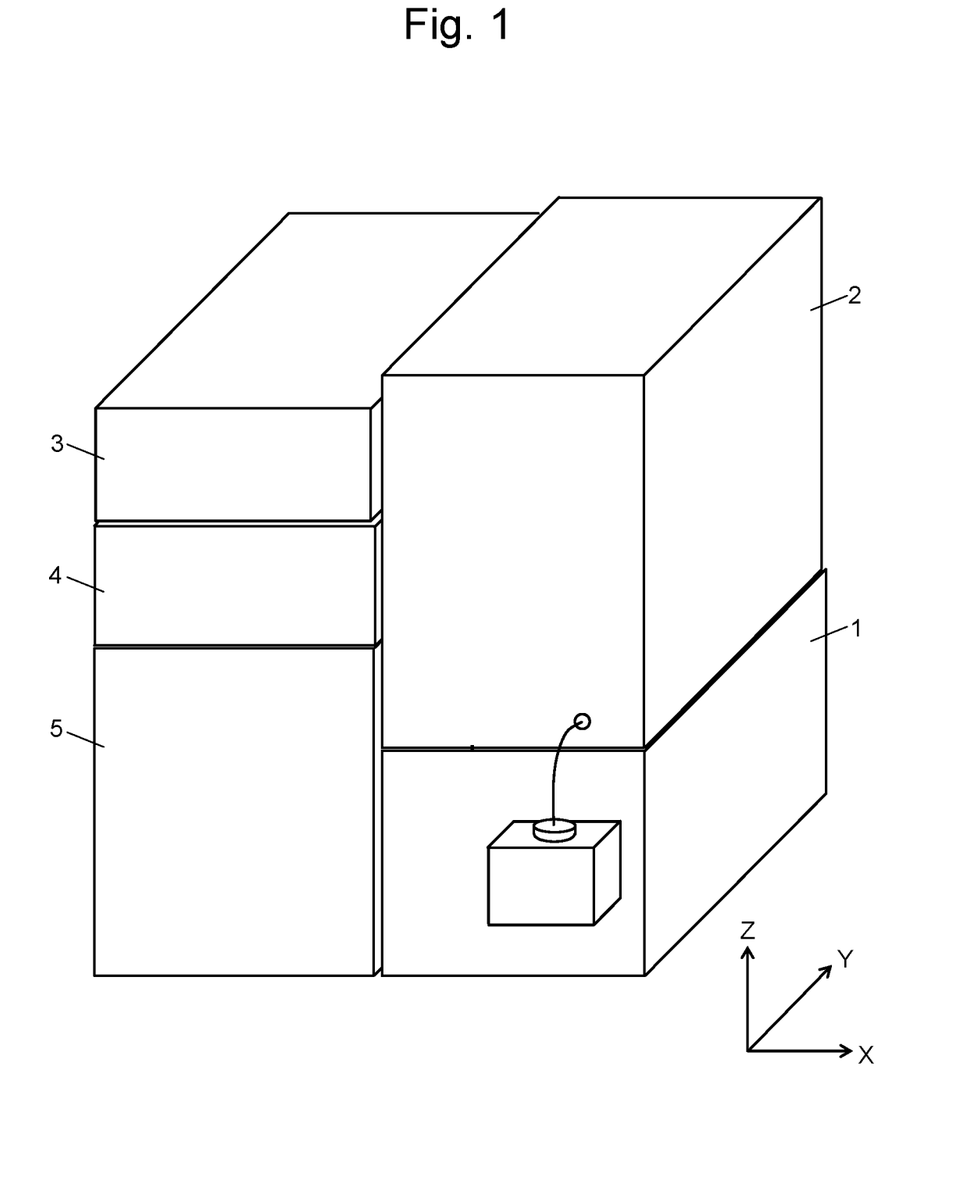
FIG. 1 is an external perspective view of an LC-MS system using a mass spectrometer according to the first embodiment of the present invention.

FIG. 1 is an external perspective view of an LC-MS system in which the mass spectrometer according to the first embodiment is used as the detector. This LC-MS system includes a mass spectrometer 1 as the detector unit, a column oven unit 2, two liquid supply units 3 and 4, as well as an injection unit 5. The liquid supply units 3 and 4 each include a mobile phase container holding a mobile phase, liquid supply pump, mixer and other components. The injection unit 5 includes an autosampler, injector and other components. The column oven unit 2 has a column inside. Those units each have a substantially rectangular-parallelepiped external shape and can be used in a stacked form as shown in FIG. 1. For convenience of explanation, the three axes of X, Y and Z which are orthogonal to each other are defined as shown in the figure. The Z-axis direction corresponds to the height direction, while the Y-axis direction corresponds to the depth direction.

Figure 2:
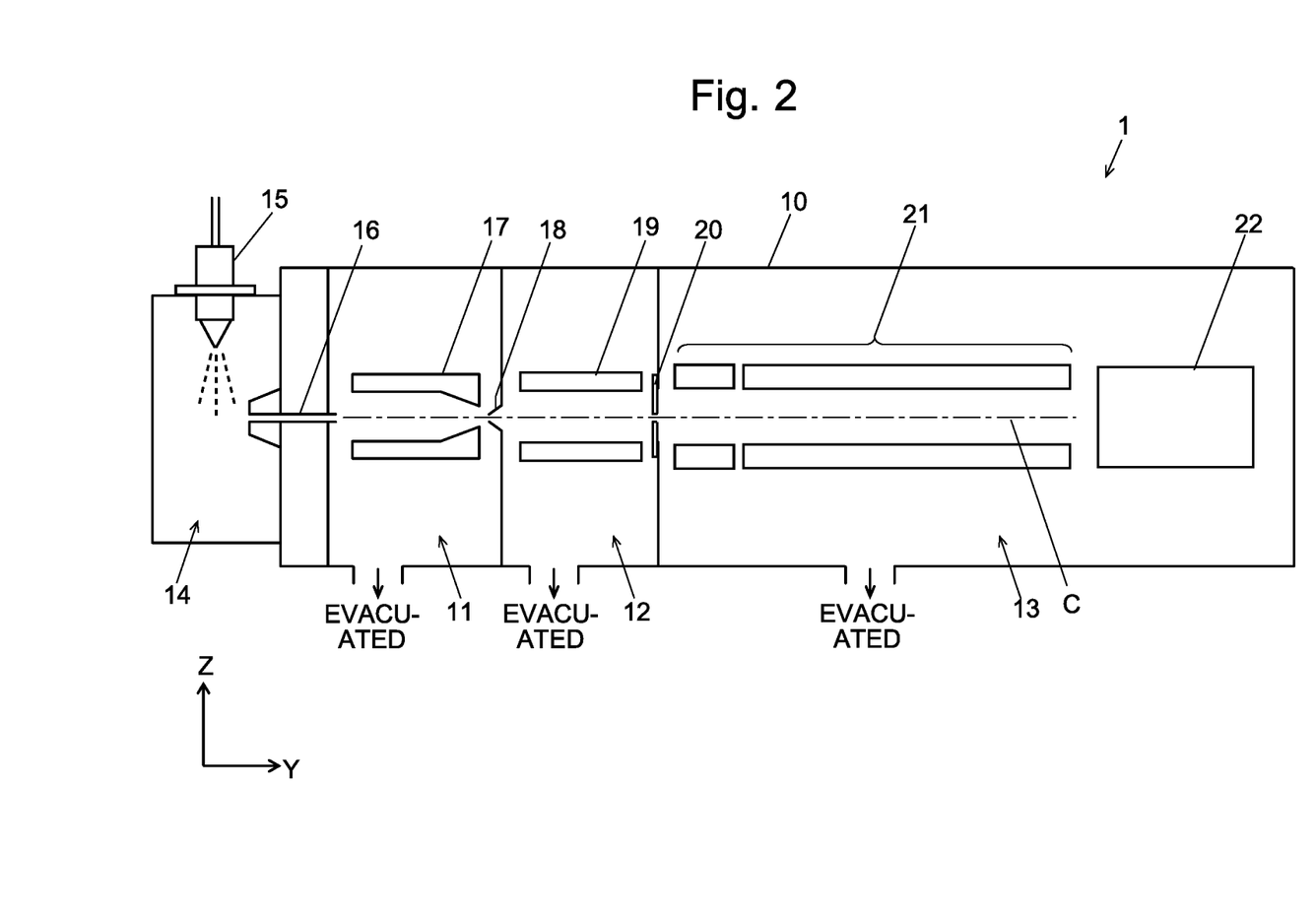
FIG. 2 is a configuration diagram showing the main components of the mass spectrometer according to the first embodiment.

FIG. 2 is a configuration diagram showing the main components of the mass spectrometer 1. The vacuum chamber 10 is internally divided into three chambers, i.e. the first intermediate vacuum space 11, second intermediate vacuum space 12 and high vacuum space 13. An ionization unit 5 which internally forms an ionization chamber 14 is attached to the front end of the vacuum chamber 10. The first intermediate vacuum space 11, second intermediate vacuum space 12 and high vacuum space 13 are respectively evacuated with vacuum pumps (not shown). The ionization chamber 14 communicates with an outer space.

The ionization chamber 14 is provided with an ionization probe 15. The ionization chamber 14 communicates with the first intermediate vacuum space 11 through a desolvation tube 16 having a small diameter. The first intermediate vacuum space 11 contains a first ion guide 17. The first intermediate vacuum space 11 communicates with the second intermediate vacuum space 12 through a small hole formed at the apex of a skimmer 18. The second intermediate vacuum space 12 contains a second ion guide 19. The second intermediate vacuum space 12 communicates with the high vacuum space 13 through a small hole formed at the center of a lens electrode 20. The high vacuum space 13 contains a quadrupole mass filter 21 including pre-rod electrodes and main rod electrodes, as well as an ion detector 22.

As shown in FIG. 2, the desolvation tube 16, first ion guide 17, skimmer 18, second ion guide 19, lens electrode 20, quadrupole mass filter 21 and ion detector 22 are arranged along a roughly straight ion beam axis C.

A brief description of an analyzing operation in the present LC-MS system is as follows:

The liquid supply units 3 and 4 supply a mobile phase, which is either one kind of liquid or a mixture of two kinds of liquid, to the column at a predetermined flow velocity (flow rate). The injection unit 5 draws one of the prepared samples, and at a predetermined timing, injects the sample into the mobile phase to be supplied to the column. The column in the column oven unit 2 is maintained, for example, at a substantially constant temperature. When the sample being pushed by the flow of the mobile phase enters the column, the various components (compounds) contained in the sample are temporally separated from each other while passing through the column. An eluate containing the separated components exits from the outlet end of the column and is introduced into the ionization probe 15 of the mass spectrometer 1.

The ionization probe 15 sprays the eluate into the ionization chamber 14 maintained at substantially atmospheric pressure to ionize sample components contained in the eluate. For example, electron ionization or atmospheric pressure chemical ionization can be used for the ionization. The generated ions are sent through the desolvation tube 16 into the first intermediate vacuum space 11, and further transported through the first ion guide 17, skimmer 18, second ion guide 19 and lens electrode 20 into the high vacuum space 13. Those ions originating from the sample components are introduced into the quadrupole mass filter 21. Only an ion having a specific mass-to-charge ratio corresponding to the voltage applied to the rod electrodes forming the quadrupole mass filter 21 is allowed to pass through this mass filter 21, while the other ions are diverged halfway. The ion detector 22 receives ions which have passed through the quadrupole mass filter 21, and produces detection signals corresponding to the amount of those ions.

Thus, in the present LC-MS system, a plurality of components contained in a sample can be separated in the temporal direction, and a detection signal corresponding to the amount (concentration) of each component can be acquired with the mass spectrometer 1. As described earlier, the ions originating from the sample components travel from the front end toward the rear end of the device, i.e. roughly in the Y-axis direction, within the vacuum chamber 10 of the mass spectrometer 1.

As noted earlier, during an analysis, the quadrupole mass filter 21, ion guides 17 and 19 as well as other ion optical elements undergo contamination due to the adhesion of the ions originating from the sample components as well as neutral particles (e.g. non-ionized molecules), solvent molecules and other particles. Therefore, it is necessary to remove those ion optical elements from the vacuum chamber 10 and clean them. However, there is the column oven unit 2 (or any other unit provided for the liquid chromatograph) placed on top of the mass spectrometer 1. Removing the unit for the sake of the maintenance work is cumbersome. To solve this problem, the mass spectrometer 1 according to the present embodiment has a characteristic structure as will be hereinafter described.

Figure 3:
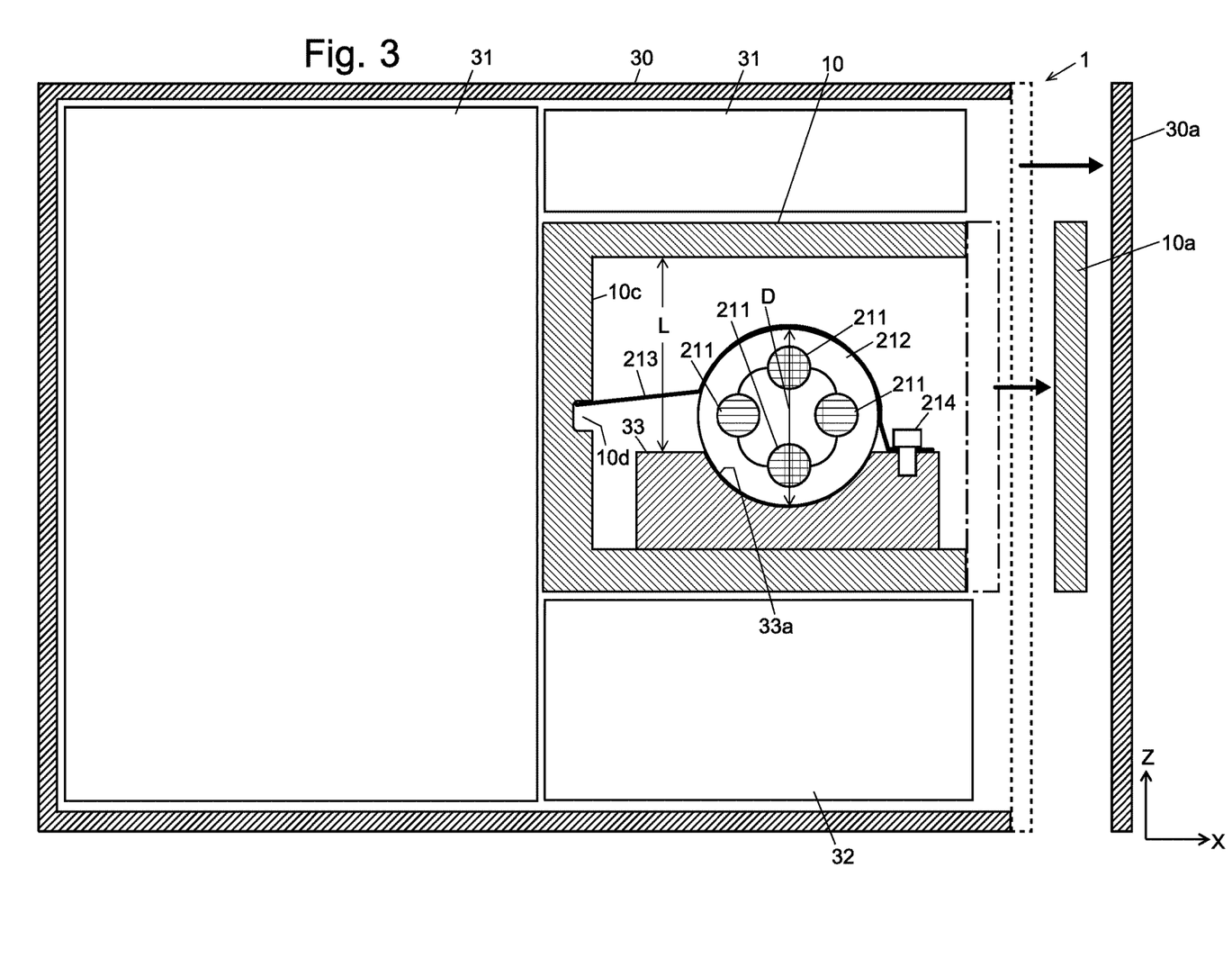
FIG. 3 is a schematic vertical sectional view of the mass spectrometer according to the first embodiment as viewed from the front.
Figure 4:
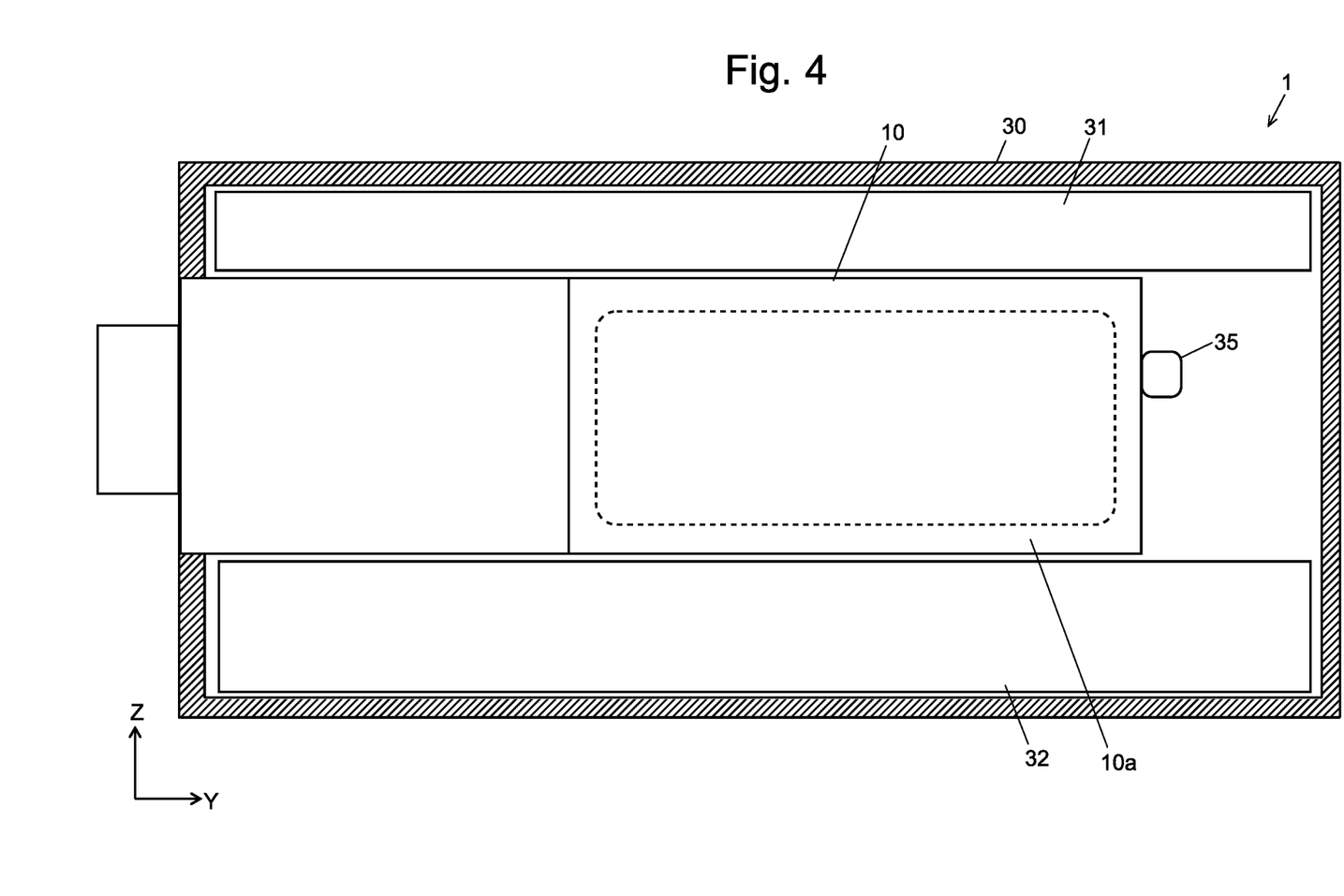
FIG. 4 is a schematic plan view of the mass spectrometer according to the first embodiment with the right-side cover removed.
Figure 5:
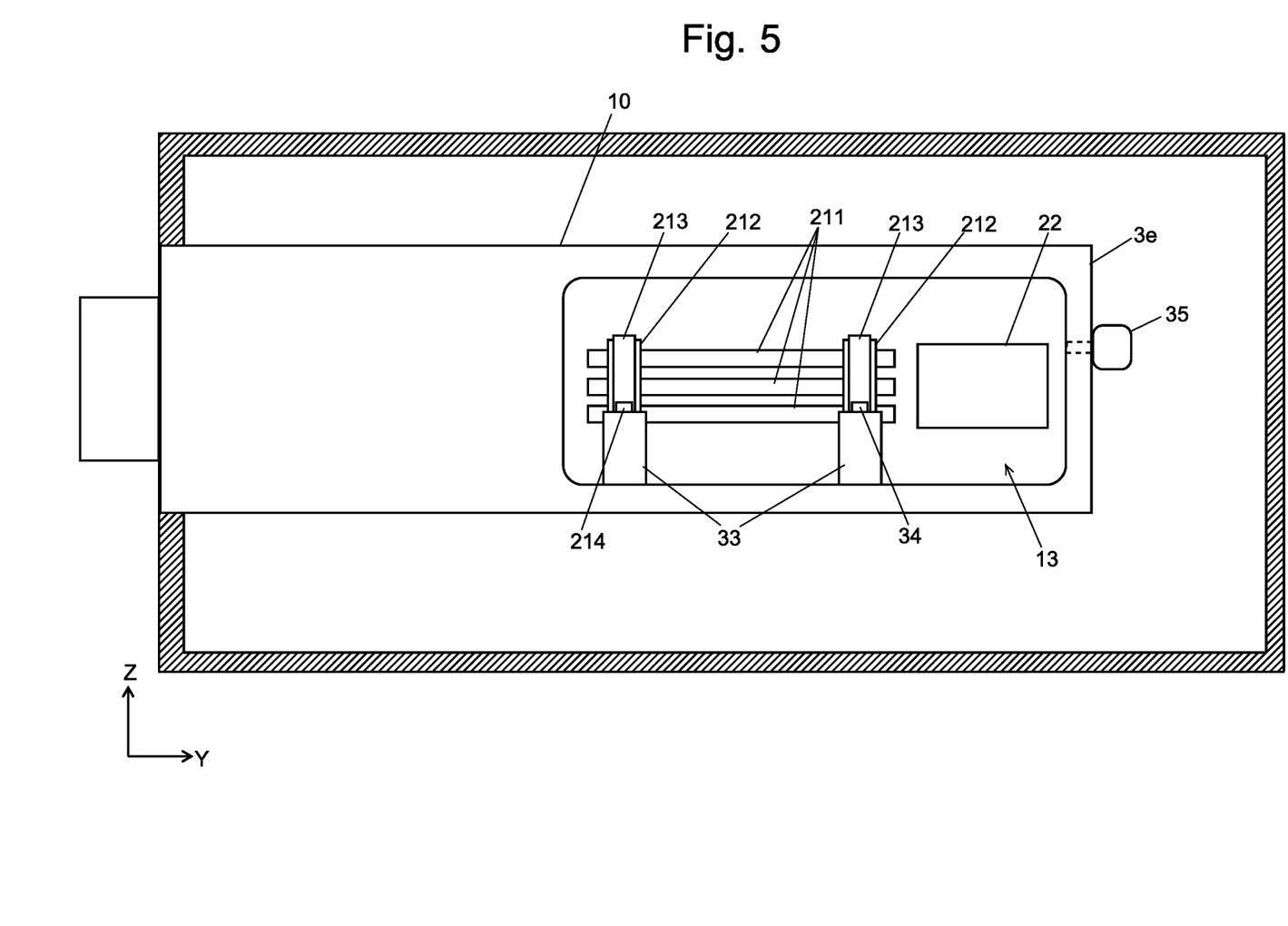
FIG. 5 is a schematic plan view of the mass spectrometer according to the first embodiment with the right-side cover of the mass spectrometer and the side cover of the vacuum chamber removed.

FIG. 3 is a schematic vertical sectional view of the mass spectrometer according to the present embodiment as viewed from the front. FIG. 4 is a schematic plan view of the mass spectrometer according to the present embodiment with the right-side cover removed. FIG. 5 is a schematic plan view of the mass spectrometer according to the present embodiment with the right-side cover of the mass spectrometer and the side cover of the vacuum chamber removed.

As shown in FIGS. 3 and 4, in the mass spectrometer 1 according to the present embodiment, the vacuum chamber 10 is arranged so as to extend in the Y-axis direction on the immediate inside of the right-side cover 30a of an exterior cover 30 having a substantially rectangular-parallelepiped shape. The right-side cover 30a is attached to the remaining portion of the exterior cover 30 with screws, for example. By removing the screws, the right-side cover 30a can be easily removed.

A vacuum pump unit 32 is located below the vacuum chamber 10, while circuit units 31 including various parts of electrical systems are located above and on the left side of the vacuum chamber 10. The section corresponding to the high vacuum space 13 formed within the vacuum chamber 10, i.e. the rear section of the vacuum chamber 10, has an opening formed on its right side, with a side cover 10a attached in a removable manner to cover the opening. The attachment of this side cover 10a can also be achieved with screws (or the like). When this side cover 10a is attached, the high vacuum space 13 is substantially air-tight and can be evacuated with a vacuum pump.

When the right-side cover 30a is removed from the exterior cover 30 as shown in FIG. 3, the right side becomes almost entirely open, as shown in FIG. 4, and the right side of the vacuum chamber 10 is exposed to the outside. After the vacuum chamber 10 is released from the evacuated state, when the side cover 10a is removed from the vacuum chamber 10, the quadrupole mass filter 21 and the ion detector 22 located within the high vacuum space 13 are exposed, as shown in FIG. 5. Accordingly, by removing the right-side cover 30a and then the side cover 10a, an operator who is going to do the maintenance work can easily access the members located within the high vacuum space 13.

The four main rod electrodes 211 forming the quadrupole mass filter 21 each have a substantially cylindrical outer shape and are fixed to two rod holders 212 with screws (not shown) in such a manner that each main rod electrode 211 is fitted in a groove formed on the inner circumference of each rod holder 212 which is substantially ring-shaped and has a predetermined thickness. The two rod holders 212, which are respectively provided at a front-end position and rear-end position of the main rod electrodes 211, determine the relative positional relationship of the four main rod electrodes 211. Though not shown in FIG. 5, the four pre-rod electrodes are respectively attached to the front ends of the four main rod electrodes 211 with an insulator in between. The rod electrodes 211 are made of an electrically conductive material, such as stainless steel or molybdenum, while the rod holders 212 are made of an insulating material, such as ceramic or synthetic resin.

Each of the two rod holders 212 is placed in a substantially semicircular recess 33a on a base 33 attached to the bottom surface of the vacuum chamber 10. In other words, the rod holders 212 have their respective lower portions fitted in the recesses 33a of the base 33. A fixation band 213 having a spring property is passed over the upper portion of each rod holder 212 so as to fix the rod holder 212 by pressing it downward, i.e. onto the recess 33a of the base 33. One end of the fixation band 213 is caught by a catching portion 10d, which is a recess formed on the inner surface of the left side wall 10c of the vacuum chamber 10. The other end of the fixation band 213 is fastened to the base 33 with a screw 214. Thus, the four main rod electrodes 211 are assuredly set at the predetermined position.

The base 33 is made of the same material as the vacuum chamber 10, such as aluminum or stainless steel. The fixation band 213 may be a strip of stainless steel, or a phosphor-bronze band having a rust-proof-treated surface, for example. As shown in FIG. 3, the distance L between the top surface of the base 33 and the ceiling of the vacuum chamber 10 is designed to be larger than the diameter D of the rod holder 212.

As described earlier, the end of the fixation band 213 located on the back side of the main rod electrodes 211 as viewed from the right side of the vacuum chamber 10 is simply inserted into and caught by the catching portion 10d. On the other hand, the end of the fixation band 213 fastened with the screw 214 is located in front of the main rod electrodes 211 as viewed from the right side of the vacuum chamber 10. Accordingly, after the side cover 10a has been removed in the previously described manner, the operator only needs to remove the screw 214 in front of the main rod electrodes 211 to easily pull the fixation band 213 out of the catching portion 10d. Due to the aforementioned relationship of L>D, after the fixation bands 213 have been removed, the rod holders 212 holding the main rod electrodes 211 can be lifted from the base 33 and directly transferred frontward to the outside of the vacuum chamber 10. Thus, the operator can easily remove the quadrupole mass filter 21 from the device to the outside, avoiding the contact between the main rod electrodes 211 and the base 33.

When the temporarily removed quadrupole mass filter 21 is to be set in the vacuum chamber 10, the operator can follow the previously described steps in the reverse order to easily attach the quadrupole mass filter 21 in the correct position.

As described earlier, the fixation band 213 is configured to fix the rod holder 212 to the base 33 by pushing it downward. Therefore, the fixation band 213 must have an appropriate spring property. Stainless steel has a comparatively high modulus of direct elasticity, and therefore, is advantageous in terms of the spring property. On the other hand, phosphor bronze has a lower modulus of direct elasticity than stainless steel. However, a fixation band made of phosphor bronze can have a spring property comparable to that of a fixation band made of stainless steel if its thickness is properly adjusted. Additionally, phosphor bronze has a higher level of thermal conductivity than stainless steel. As described in Patent Literature 1 or other related documents, when a radio-frequency voltage is applied to the main rod electrodes 211 during an analysis, the rod holders 212 themselves generate heat due to the induction loss in the material of the rod holders 212. The use of phosphor bronze for the fixation bands 213 improves their thermal conductivity, which allows the heat to be easily conducted from the rod holders 213 to the base 33 through the fixation bands 213, to be ultimately transferred from the base 33 to the vacuum chamber 10 (or other appropriate members). This promotes the heat release from the rod holders 212 and thereby prevents a positional error of the main rod electrodes 211 due to thermal expansion of the rod holders 212.

In FIGS. 3 and 5, the wiring and other structures for applying voltages to the four main rod electrodes 211 are omitted. For example, a structure disclosed in Patent Literature 1 may be adopted, in which a predetermined voltage is applied to each main rod electrode via a short-circuit spring which is in elastic contact with the main rod electrode. Needless to say, the voltage-applying structure is not limited to this example.

As described thus far, the mass spectrometer according to the present embodiment allows an operator to easily access the inside of the vacuum chamber 10 from the right side of the device, and easily remove the quadrupole mass filter 21 from the inside of the vacuum chamber 10, or conversely, easily attach the quadrupole mass filter 21 to the inside of the vacuum chamber 10. It is unnecessary for the other units stacked on the mass spectrometer 1 to be removed for the maintenance work. The removal and attachment of the quadrupole mass filter 21 are also easy and require only a minimal amount of time, so that the entire maintenance task can be efficiently performed.

Understandably, not only the quadrupole mass filter 21, but also the ion guide 17 or 19 as well as other ion optical elements can also be configured in a similar manner. It should be noted that the ion guides 17 and 19 as well as other elements located in an upstream section of the ion stream may structurally be configured to be pulled toward the front end of the device. By comparison, it is considerably difficult to configure the quadrupole mass filter 21, collision cell (which will be described later) and other elements located in a downstream section of the ion stream to be pulled toward the front end of the device. Accordingly, the configuration which allows the removal and attachment from a side wall of the device is particularly advantageous for ion optical elements which are located in a rear section of the device.

The first embodiment described thus far is an example in which the present invention is applied in a single type quadrupole mass filter. The present invention is also applicable in other types of mass spectrometers. As a specific example, it can be applied in a triple quadrupole mass spectrometer. A triple quadrupole mass spectrometer includes two quadrupole mass filters respectively located on the front and rear sides of a collision cell. It is natural that the front and rear quadrupole mass filters can be configured in the previously described manner. A similar configuration can also be adopted for the collision cell.

Second Embodiment

Figure 6:
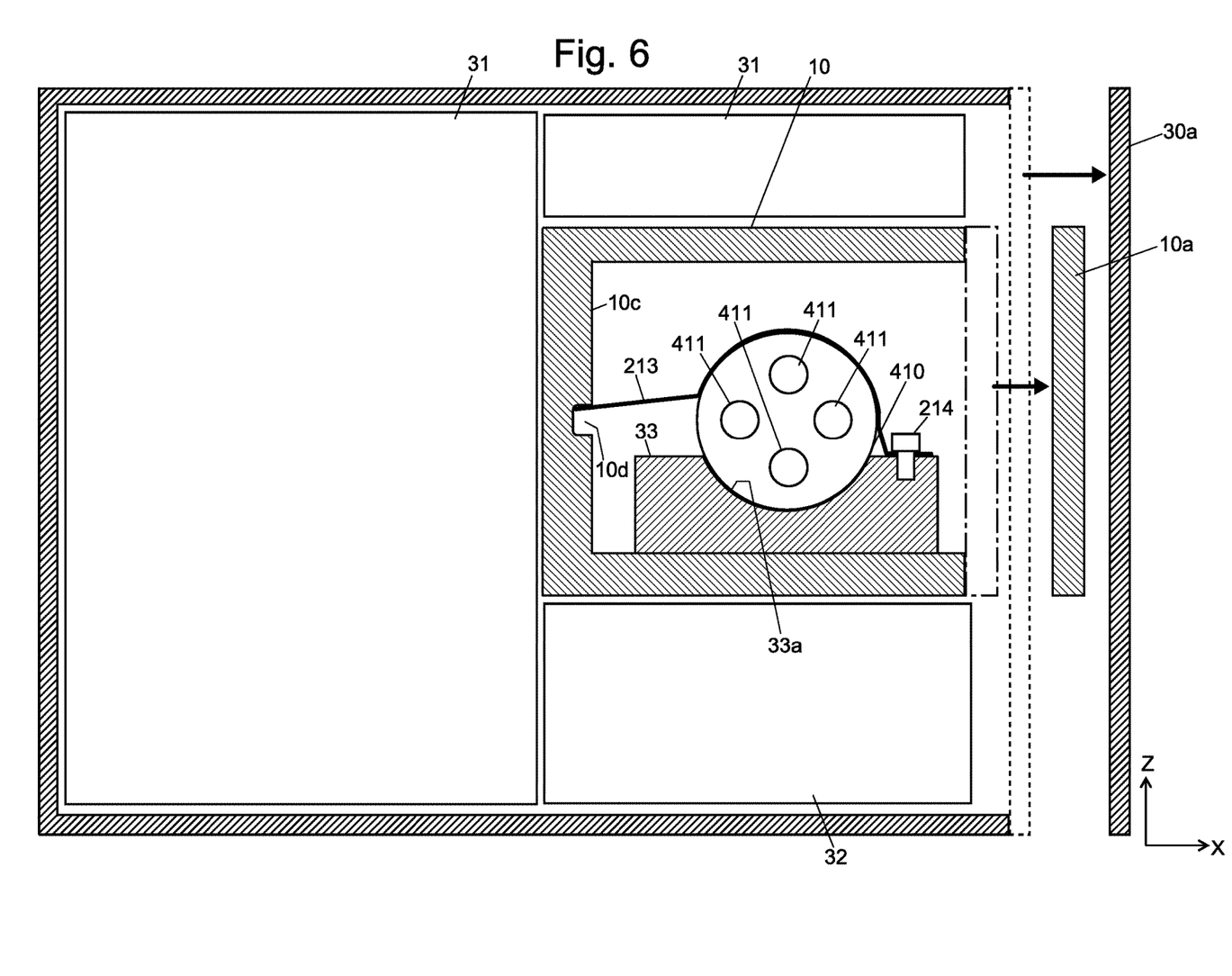
FIG. 6 is a schematic vertical sectional view of a mass spectrometer according to the second embodiment of the present invention as viewed from the front.
Figure 7:
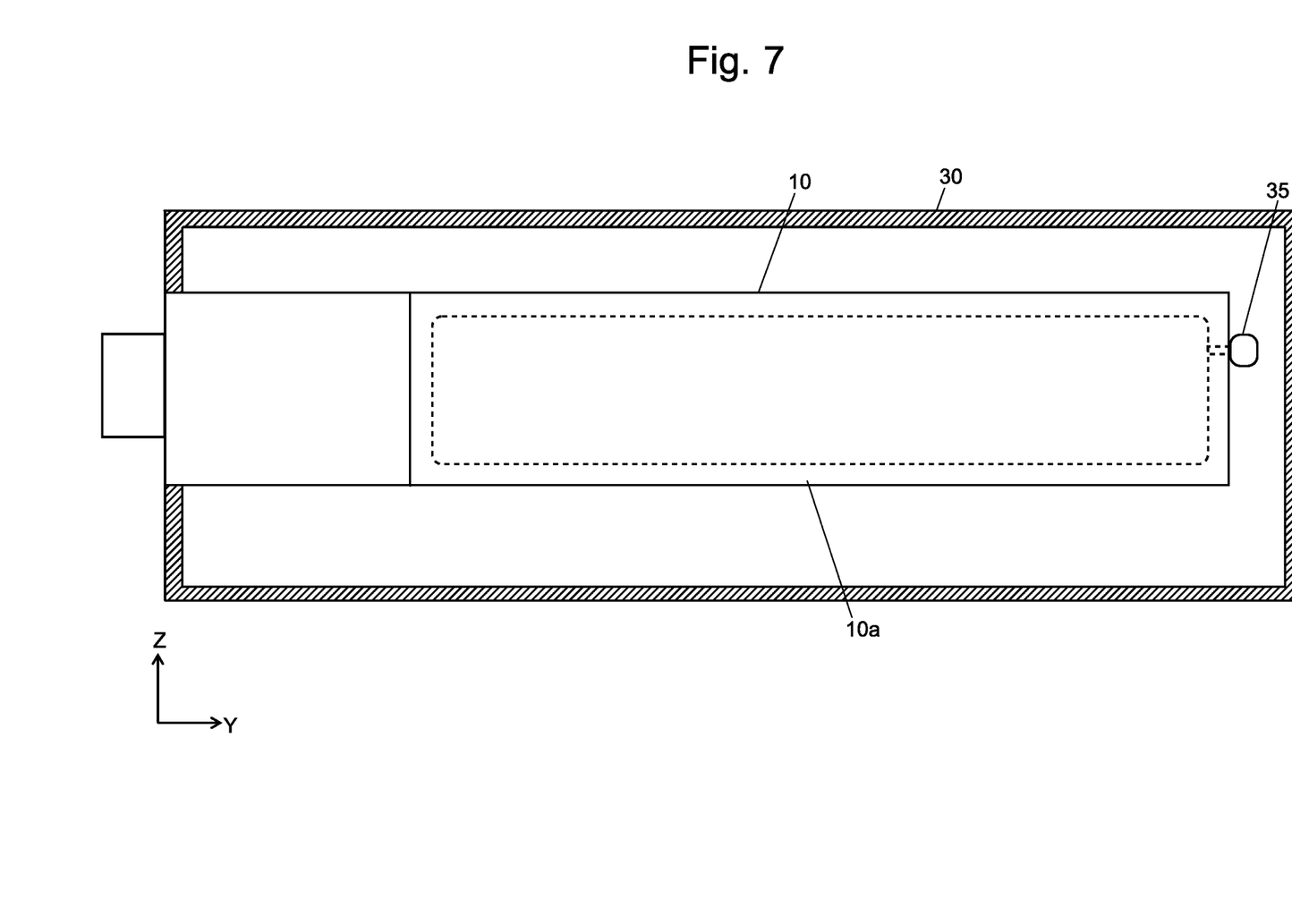
FIG. 7 is a schematic plan view of the mass spectrometer according to the second embodiment with the right-side cover removed.
Figure 8:
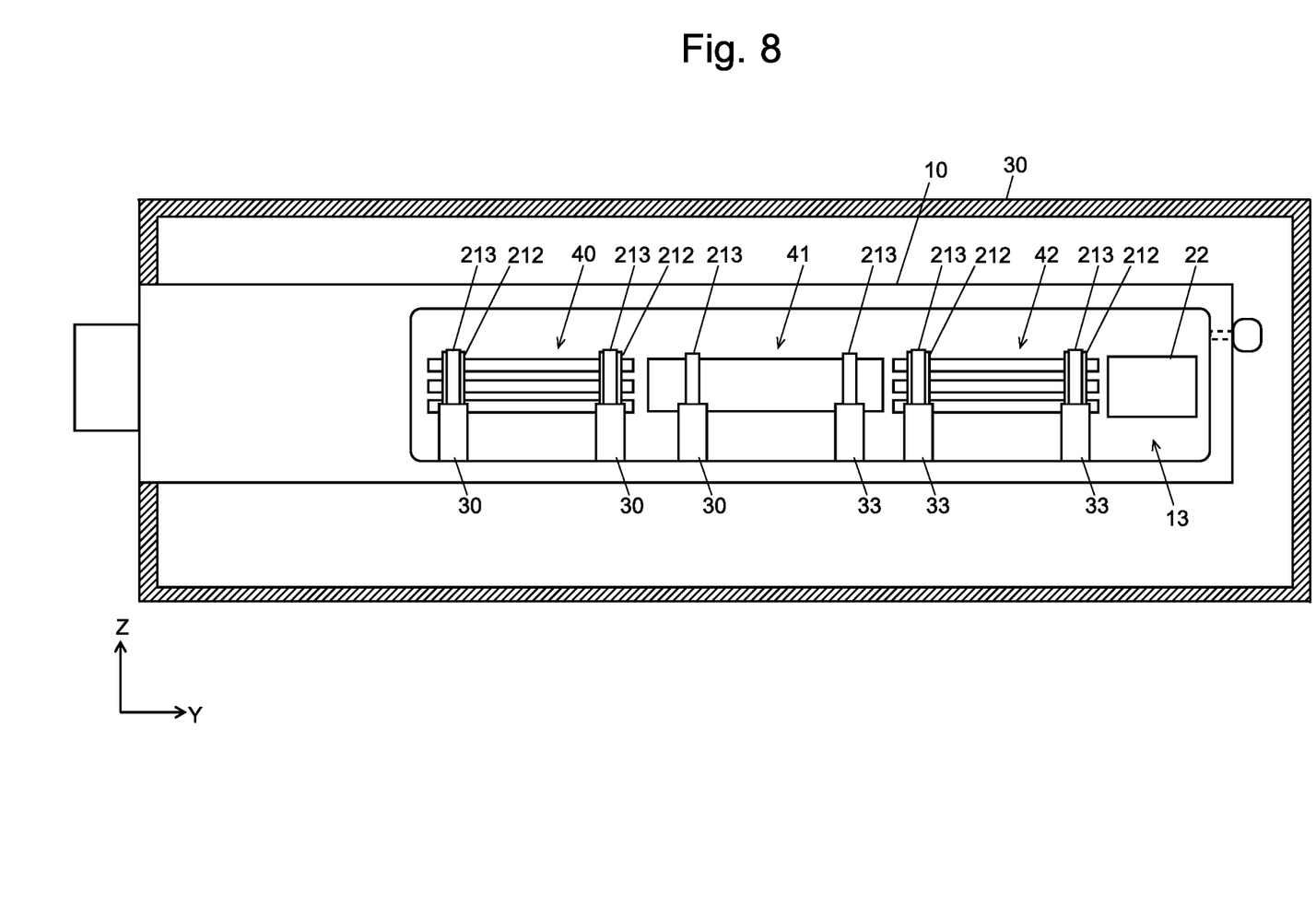
FIG. 8 is a schematic plan view of the mass spectrometer according to the second embodiment with the right-side cover of the mass spectrometer and the side cover of the vacuum chamber removed.

A triple quadrupole mass spectrometer as the second embodiment of the present invention is hereinafter described with reference to FIGS. 6-8. FIG. 6 is a schematic vertical sectional view of a mass spectrometer according to the second embodiment as viewed from the front. FIG. 7 is a schematic plan view of the mass spectrometer according to the second embodiment with the right-side cover removed. FIG. 8 is a schematic plan view of the mass spectrometer according to the second embodiment with the right-side cover of the mass spectrometer and the side cover of the vacuum chamber removed. That is to say, FIGS. 6-8 corresponds to FIGS. 3-5 in the first embodiment. The components which are the same as or correspond to those of the mass spectrometer according to the first embodiment are denoted by the same reference signs.

As shown in FIG. 8, the high vacuum space 13 contains a front quadrupole mass filter 40 and a rear quadrupole mass filter 42 with a collision cell 41 sandwiched in between. The collision cell 41 has a cell body 410 which is substantially cylindrical in shape, with an ion passage opening formed in both end faces of the cylinder. The cell body 410 contains four rod electrodes 411 forming an ion guide. The number of rod electrodes forming the ion guide is not limited to four. Collision induced dissociation (CID) gas, which is a predetermined kind of inert gas, is introduced into the cell body 410. Ions which have passed through the front quadrupole mass filter 40 come in contact with the CID gas and undergo dissociation within the cell body 410. Product ions produced through the dissociation are converged by an electric field created by a radio-frequency voltage applied to the rod electrodes 411, and sent into the rear quadrupole mass filter 42.

In the mass spectrometer according to the second embodiment, the cell body 410 of the collision cell 41 is also securely held by the base 33 and the fixation band 410 in an easy-to-remove manner, as with the front quadrupole mass filter 40 and the rear quadrupole mass filter 42. When the collision cell 41 needs to be cleaned, the operator can easily remove the collision cell 41 from the vacuum chamber 10 to the outside by initially removing the right-side cover 30a and the side cover 10a to make the inside of the high vacuum space 13 accessible, and subsequently removing the screws 214 with which the fixation bands 213 are fastened.

[Attachment Structure of Ion Gauge]

In the mass spectrometers according to the first and second embodiments, an ion gauge 35 for measuring the degree of vacuum within the high vacuum space 13 is attached to the back side of the rear wall 10e of the vacuum chamber 10. The ion gauge 35 is a consumable part having a filament and should therefore be as easy as possible to replace. A common practice is to provide the exterior cover with a back panel that is removable so that the screws or other elements fixing the ion gauge from the rear side can be removed for the removal of the ion gauge. However, an LC-MS system as shown in FIG. 1 is often installed with its back side located close to a wall, so that an access from the rear side is difficult. To address this problem, the mass spectrometers according to the first and second embodiments have adopted a construction which allows the ion gauge 35 to be easily accessed from the right side for removal and attachment.

Figure 9:
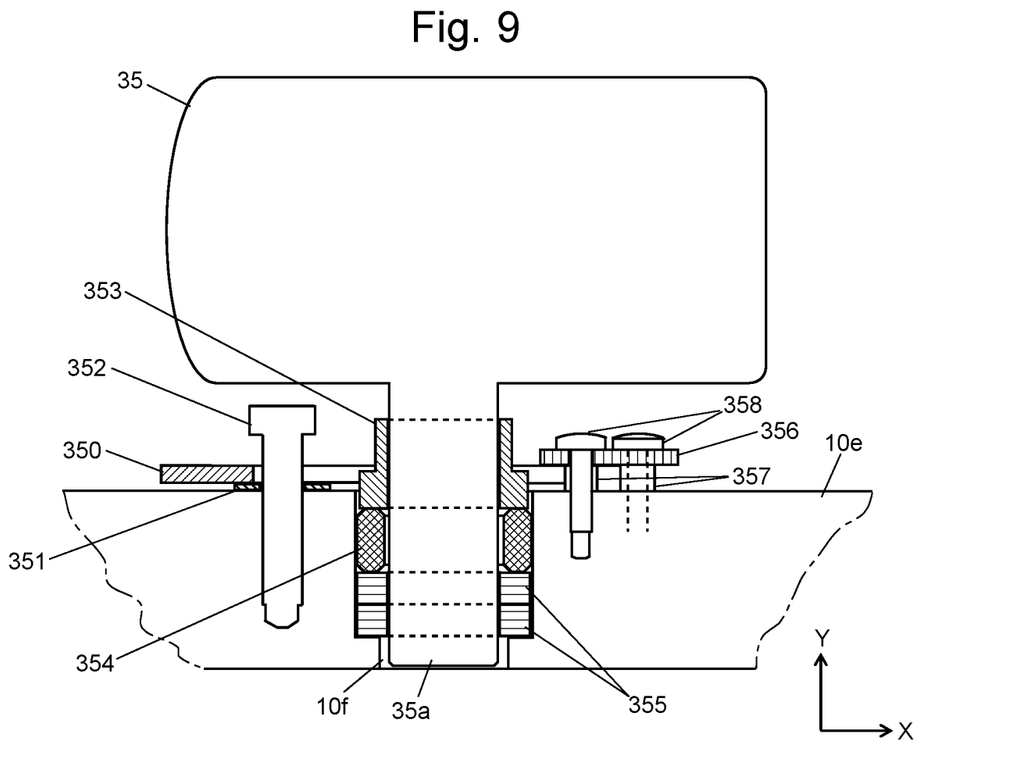
FIG. 9 is a schematic horizontal sectional view of an ion-gauge attachment structure in the mass spectrometer according to the first embodiment.
Figure 10:
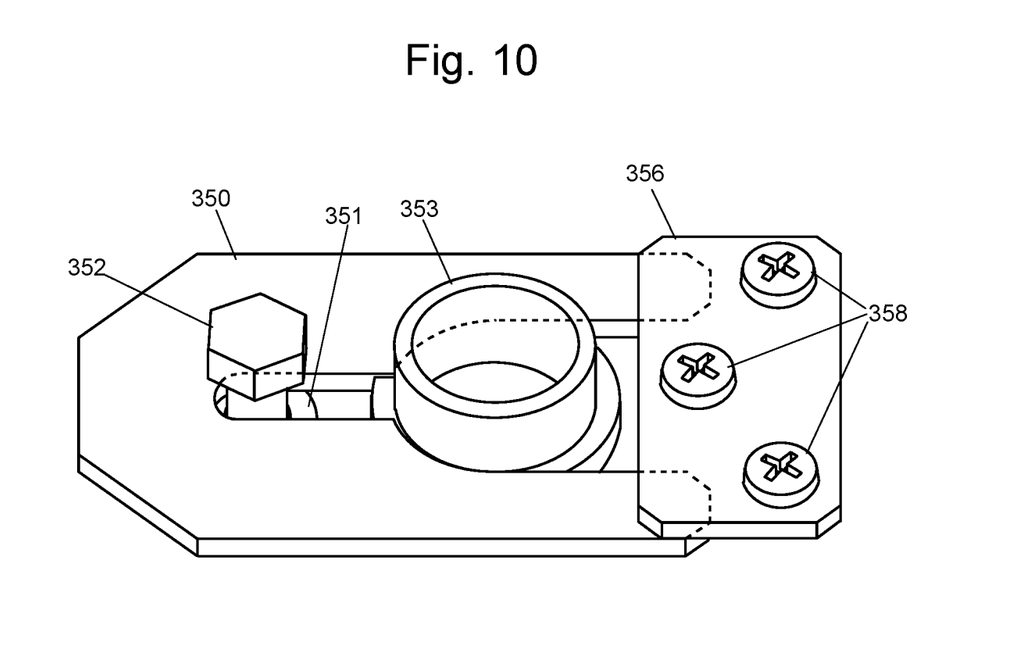
FIG. 10 is a perspective view of the part used in the ion-gauge attachment structure in the mass spectrometer according to the first embodiment.

FIG. 9 is a schematic horizontal sectional view of an ion-gauge attachment structure in the mass spectrometer according to the first embodiment. FIG. 10 is a perspective view of the part used in the ion-gauge attachment structure in the mass spectrometer according to the first embodiment.

The vacuum chamber 10 has an attachment hole 10f penetrating through the rear wall 10e. A connection tube portion 35a leading to the inner space of the ion gauge 35 is inserted into the attachment hole 10f. The part for attaching the ion gauge 35 in the attachment hole 10f includes the following members: a first plate member 350 which is substantially U-shaped; a ring-shaped spacer 351 for adjusting the attachment height of the first plate member 350; a bolt 352 for hooking the first plate member 350; a flange 353 in the form of a stepped cylinder; a substantially ring-shaped gasket presser 354; two ring-shaped gaskets 355 made of rubber; a second plate-shaped member 356 for catching both ends of the first plate-shaped member 350; a ring-shaped spacer 357 for adjusting the attachment height of the second plate member 356; and screws 358 for fastening the second plate member 356.

As shown in FIG. 9, the connection tube portion 35a of the ion gauge 35 has the gaskets 355, gasket presser 354 and flange 353 fitted on its circumferential surface from its tip portion. When the connection tube portion 35a is plugged into the attachment hole 10f, the gaskets 355 come in contact with a step formed on the inner circumference of the attachment hole 10f and are thereby held at the position. The bolt 352 is screwed into a bolt hole formed in the rear wall 10e of the vacuum chamber 10, passing through the spacer 351. The first plate member 350 is set so that the spacer 351 is clamped between the first plate member 350 and the rear wall 10e, with the bolt 352 and the flange 353 inserted between the two U-shaped extending portions. The U-shaped extending portions of the first plate member 350 have a curved shape fitting with the outer circumferential form of the flange 353. The first plate member 350 is slid to the position where the curved portion comes in contact with the flange 353.

The second plate member 356 is fastened to the rear wall 10e with the three screws 358, with the spacer 357 located between the same member 356 and the rear wall 10e. Tightening the screws 358 makes the second plate member 356 press the end portions of the U-shaped extending portions of the first plate member 350, which presses the flange 353 into the attachment hole 10f. The flange 353 pushes the gaskets 355 via the gasket presser 354. Since the gaskets 355 are made of rubber and have their position restricted, they are squeezed by the pressure and come in tight contact with the inner circumferential surface of the attachment hole 10f as well as the outer circumferential surface of the connection tube portion 35a of the ion gauge 35. In this manner, the ion gauge 35 can be attached while ensuring airtightness of the inside of the high vacuum space 13.

When the ion gauge 35 needs to be removed for the replacement of the ion gauge 35 or other purposes, the operator loosens the screws 358 from the right side of the device, using an offset screwdriver or similar tool. The first plate member 350 is thereby released from the clamped state, and the gaskets 355 return to their original form, making the connection tube portion 35a of the ion gauge 35 easier to be pulled from the attachment hole 10f. Accordingly, the ion gauge 35 being accessed from the right side of the device can be easily removed. For the attachment of the ion gauge 35, the previously described removal steps can be followed in the reverse order.

Thus, the ion gauge 35 can be easily removed or attached from the right side of the mass spectrometer 1.

It should be noted that the previous embodiments are mere examples of the present invention. It is evident that any change, addition or modification appropriately made within the spirit of the present invention will also fall within the scope of claims of the present application.

[Various Modes]

A person skilled in the art can understand that the previously described illustrative embodiments are specific examples of the following modes of the present invention.

(Clause 1) One mode of the mass spectrometer according to the present invention includes:

a vacuum chamber configured to form a vacuum space inside, the vacuum chamber having two side walls opposite to each other across an ion beam axis extending within the vacuum space, with one of the side walls being openable and closeable;

an ion optical element configured to perform a predetermined operation on an ion originating from a sample; a base located on the bottom surface of the vacuum chamber, with the ion optical element placed on the base;

a fixation band in the form of a thin plate for fixing the ion optical element on the base by holding at least a portion of the ion optical element between the base and the fixation band so as to press the ion optical element onto the base;

a band-catching portion configured to catch one end of the fixation band, the band-catching portion located on the inside face of the side wall of the vacuum chamber on the opposite side from the openable-and-closeable side wall of the vacuum chamber; and a band-fixing portion configured to fix the other end of the fixation band to the base, the band-fixing portion located on an area of the base on the side where the openable-and-closeable side wall of the vacuum chamber is present.

In the mass spectrometer described in Clause 1, a side wall of the vacuum chamber can be opened, not the top (ceiling) wall of the chamber. When this side wall is opened, the band-fixing portion is located in front of the ion optical element. On the back side of the ion optical element as viewed from the opening of the vacuum chamber, the fixation band is simply caught by the band-catching portion. Therefore, an operator can easily remove the fixation band by merely releasing the band-fixing portion on the front side from its fixing position. After the fixation band has been removed, the ion optical element can be separated from the top surface of the base and removed from the device to the outside.

Thus, the mass spectrometer described in Clause 1 allows the maintenance work of an ion optical element to be performed even with another device still placed on top of the mass spectrometer, i.e. without removing that device. Thus, a high level of working efficiency can be achieved. Furthermore, since the removal and attachment of the ion optical element can be achieved through simple tasks, the maintenance work can be efficiently performed. Some accidents can also be prevented, such as a tool or similar object coming in contact with the ion optical element and damaging it. Despite the simplicity of the task, the ion optical element can be accurately attached to a correct position.

(Clause 2) In the mass spectrometer described in Clause 1, the ion optical element may be a quadrupole mass filter including four rod electrodes arranged around a straight axis and a rod holder made of an insulating material and configured to hold the four rod electrodes, and the fixation band may be configured to be attached so as to press the rod holder onto the base.

In the mass spectrometer described in Clause 2, if a quadrupole mass filter used for separating ions according to their mass-to-charge ratios has been contaminated, the mass filter can be removed and cleaned in a comparatively easy manner.

In many cases, quadrupole mass filters are located in a downstream section of the ion stream in the path of the ions originating from a sample in the mass spectrometer. Therefore, in the case of a device in which an ion source is located in a front section of the device, and ions generated by the ion source are sent into a rear section of the device, a quadrupole mass filter is located in the rear section of the device. In that case, it is difficult to adopt a structure which allows the quadrupole mass filter to be pulled frontward for removal. By comparison, the mass spectrometer described in Clause 2 allows the quadrupole mass filter to be removed to one of the two sides of the device, whereby the working efficiency of the maintenance work for the quadrupole mass filter is improved.

(Clause 3) In the mass spectrometer described in Clause 1, the ion optical element may be a collision cell including a cell body configured to dissociate an ion, and the fixation band may be configured to be attached so as to press the cell body onto the base.

In the mass spectrometer described in Clause 3, if the cell body of a collision cell for dissociating an ion or an ion guide contained in the cell body has been contaminated, the collision cell can be removed and cleaned in a comparatively easy manner. As with the quadrupole mass filter, the collision cell is often located in a downstream section of the ion stream and arranged in a rear section of the device. Even in that case, the collision cell can be easily removed and attached.

In summary, the ion optical element in the mass spectrometer according to the present invention may be any ion optical element located at any position in the ion path, although the present invention can be considered to be particularly effective for ion optical elements located in a rear section of the ion path, i.e. in a downstream section of the ion stream.

(Clause 4) In the mass spectrometer described in Clause 2, the distance between the inner surface of the ceiling wall of the vacuum chamber and the top surface of the base may be larger than the outer diameter of the rod holder which is ring-shaped.

(Clause 5) In the mass spectrometer described in Clause 3, the distance between the inner surface of the ceiling wall of the vacuum chamber and the top surface of the base may be larger than the outer diameter of the cell body having a cylindrical shape.

In the mass spectrometer described in Clause 4 or 5, after the fixation band has been removed, the quadrupole mass filter or collision cell can be lifted from the base and directly transferred to the outside of the vacuum chamber. The quadrupole mass filter or collision cell can be removed from or set into the vacuum chamber without coming in contact with the base or the ceiling of the vacuum chamber. Accordingly, the removal and attachment of the quadrupole mass filter or collision cell can be easily performed, and furthermore, those elements are also prevented from being damaged due to contact with the base or the ceiling of the vacuum chamber.

(Clause 6) In the mass spectrometer described in any one of Clauses 1-5, the vacuum chamber may be placed so that the openable-and-closeable side wall of the vacuum chamber faces a side wall of the exterior cover.

In the mass spectrometer described in Clause 6, when the side wall of the exterior cover is opened, the vacuum chamber is present immediately inside the opening. When the side wall of the vacuum chamber is subsequently opened, the ion optical element can be removed from or set into the chamber. Accordingly, the mass spectrometer described in Clause 6 even more facilitates the removal and attachment of the ion optical element.

(Clause 7) In the mass spectrometer described in Clause 6, the exterior cover may have a top surface including a flat portion configured to allow another device to be placed.

In the mass spectrometer described in Clause 7, for example, a liquid chromatograph unit can be placed on top of the mass spectrometer. This reduces the installation space for the entire liquid chromatograph mass spectrometer system.

(Clause 8) In the mass spectrometer according to any one of Clauses 1-7, the fixation band may be an elastic member.

In the mass spectrometer described in Clause 8, for example, if the rod holder or cell body fixed with the fixation band undergoes a change in shape due to thermal expansion, the fixation band absorbs that change in shape. Therefore, the fixation band can assuredly fix the rod holder or cell body (or the like) to the base while preventing them from being damaged. In particular, if phosphor bronze, which is a good thermal conductor, is used as the material for the elastic member, the fixation band helps efficiently release the heat from the rod holder or cell body, and thereby suppresses the heating of those elements.

(Clause 9) In the mass spectrometer described in Clause 2, the fixation band may be configured to be in surface contact with an outer circumferential surface of at least a portion of the rod holder between the rod electrodes neighboring each other in the circumferential direction.

In the mass spectrometer described in Clause 9, the fixation band comes in contact with the portion where the amount of heat generation is largest in the rod holder. Therefore, the heat from the rod holder can be dissipated in a satisfactory manner.

REFERENCE SIGNS LIST

1 . . . Mass Spectrometer
2 . . . Column Oven Unit
3, 4 . . . Liquid Supply Unit
5 . . . Injection Unit
10 . . . Vacuum Chamber
10a . . . Side Cover
10c . . . Left Side Wall
10d . . . Catching Portion
10e . . . Rear Wall
10f . . . Attachment Hole
11 . . . First Intermediate Vacuum Space
12 . . . Second Intermediate Vacuum Space
13 . . . High Vacuum Space
14 . . . Ionization Chamber
15 . . . Ionization Probe
16 . . . Desolvation Tube
17 . . . First Ion Guide
18 . . . Skimmer
19 . . . Second Ion Guide
20 . . . Lens Electrode
21 . . . Quadrupole Mass Filter
211 . . . Main Rod Electrode
212 . . . Rod Holder
213 . . . Fixation Band
214 . . . Screw
22 . . . Ion Detector
30 . . . Exterior Cover
30a . . . Right-Side Cover
31 . . . Circuit Unit
32 . . . Vacuum Pump Unit
33 . . . Base
33a . . . Recess
35 . . . Ion Gauge
35a . . . Connection Tube Portion
350 . . . First Plate Member
351, 357 . . . Spacer
352 . . . Bolt
353 . . . Flange
354 . . . Gasket Presser
355 . . . Gasket
356 . . . Second Plate Member
358 . . . Screw
40 . . . Front Quadrupole Mass Filter
41 . . . Collision Cell
410 . . . Cell body
411 . . . Rod Electrode
42 . . . Rear Quadrupole Mass Filter
C . . . Ion Beam Axis

The invention claimed is:

1. A mass spectrometer comprising:
   a vacuum chamber configured to form a vacuum space inside, the vacuum chamber having two side walls opposite to each other across an ion beam axis extending within the vacuum space, with one of the side walls being openable and closeable;
   an ion optical element configured to perform a predetermined operation on an ion originating from a sample;
   a base located on a bottom surface of the vacuum chamber, with the ion optical element placed on the base;
   a fixation band in a form of a thin plate for fixing the ion optical element on the base by holding at least a portion of the ion optical element between the base and the fixation band so as to press the ion optical element onto the base;
   a band-catching portion configured to catch one end of the fixation band, the band-catching portion located on an inside face of a side wall of the vacuum chamber on an opposite side from the openable-and-closeable side wall of the vacuum chamber; and
   a band-fixing portion configured to fix another end of the fixation band to the base, the band-fixing portion located on an area of the base on a side where the openable-and-closeable side wall of the vacuum chamber is present.

2. The mass spectrometer according to claim 1, wherein the ion optical element is a quadrupole mass filter including four rod electrodes arranged around a straight axis and a rod holder made of an insulating material and configured to hold the four rod electrodes, and the fixation band is configured to be attached so as to press the rod holder onto the base.

3. The mass spectrometer according to claim 2, wherein a distance between an inner surface of a ceiling wall of the vacuum chamber and a top surface of the base is larger than an outer diameter of the rod holder which is ring-shaped.

4. The mass spectrometer according to claim 2, wherein the fixation band is configured to be in surface contact with an outer circumferential surface of at least a portion of the rod holder between the rod electrodes neighboring each other in a circumferential direction.

5. The mass spectrometer according to claim 1, wherein the ion optical element is a collision cell including a cell body configured to dissociate an ion, and the fixation band is configured to be attached so as to press the cell body onto the base.

6. The mass spectrometer according to claim 5, wherein a distance between an inner surface of a ceiling wall of the vacuum chamber and a top surface of the base is larger than an outer diameter of the cell body having a cylindrical shape.

7. The mass spectrometer according to claim 1, wherein the vacuum chamber is placed so that the openable-and-closeable side wall of the vacuum chamber faces a side wall of an exterior cover.

8. The mass spectrometer according to claim 7, wherein the exterior cover has a top surface including a flat portion configured to allow another device to be placed.

9. The mass spectrometer according to claim 1, wherein the fixation band is an elastic member.

* * * * *